Sept. 29, 1970  N. C. FOSTER  3,531,580
EPOXY ELECTRICAL INSULATING MEMBERS WITH WEATHER
RESISTANT POLYESTER COATING
Filed July 15, 1966
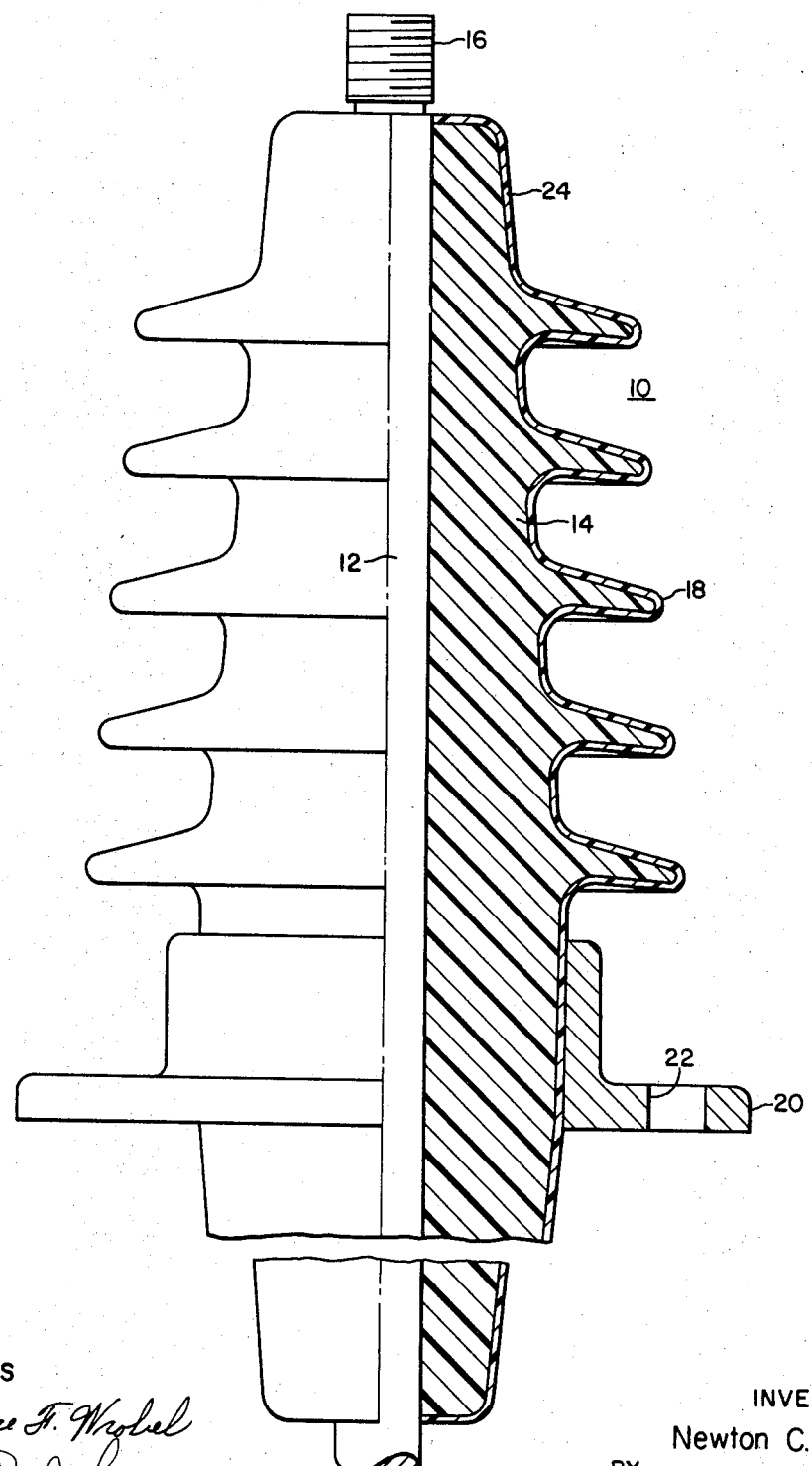
WITNESSES
Theodore F. Wrobel
Lee P. Johns
INVENTOR
Newton C. Foster
BY
Frederick Shepoe
ATTORNEY

United States Patent Office 3,531,580
Patented Sept. 29, 1970

3,531,580
EPOXY ELECTRICAL INSULATING MEMBERS WITH WEATHER RESISTANT POLYESTER COATING
Newton C. Foster, Pittsburgh, Pa., assignor to Westinghouse Electric Corporation, Pittsburgh, Pa., a corporation of Pennsylvania
Filed July 15, 1966, Ser. No. 569,786
Int. Cl. H01b *17/50*
U.S. Cl. 174—152        5 Claims This invention relates to improvements in a method for casting of epoxy resinous articles, and bushings in particular, having a weather resistant resinous polyester coating or layer on exposed surfaces thereof.

Epoxy resins undergo relatively low shrinkage during polymerization and consequently are less susceptible to shrinkage cracks and other defects, for which reason they are useful as electrical insulation. However, generally epoxy resins have relatively poor resistance to weather and form chalked surfaces when used outdoors. The chalked surfaces eventually become eroded and contaminated with moisture and dirt lodging in the eroded areas which under voltage stress leads to arcing and tracking with resin decomposition causing progressively larger carbonaceous paths and thereby resulting in ultimate electrical breakdown. Various additives such as hydrated alumina, have been added to the epoxy resins to reduce the carbon path formation that normally results in electrical breakdown. But where high voltage equipment, above 1000 volts, for example, is involved the problem is persistent and not fully solved for long time outdoor use of epoxy insulators. As a result, cast epoxy resins for electrical insulation have been generally restricted to indoor use.

In accordance with the present invention, it has been found that the foregoing problems may be overcome by applying a bonded surface layer of a polyester resin to the cast epoxy insulation. Polyester resins, with the acrylic modified polyesters being outstanding, have much better resistance to weathering than epoxy resins. The combination of a bonded polyester resin surface layer on a cast epoxy resin insulator body combines at the same time the better weather characteristics of the polyester resin with the low shrinkage polymerization property and other good electrically insulating and mechanical properties of the epoxy resin.

Accordingly, it is an object of this invention to provide a weather resistance insulator, and bushings in particular, and methods for producing the same which incorporates the advantages of the desirable weather resistant characteristics of a polyester resin and utilizes the low shrinkage polymerization and other desirable characteristics of an epoxy resin.

It is another object of this invention to provide a case weather resistant insulator embodying a body of an epoxy resin and method for producing the same which resists the development of arcing and tracking due to chalked and eroded surfaces which lead to early electrical breakdown.

Finally, it is an object of this invention to satisfy the foregoing objects and desiderata in a simple and expedient manner.

Briefly, the present invention consists essentially of an electrical insulating member and, in particular, a bushing having an outer weather exposed surface layer, the outer surface may be formed with a plurality of longitudinally spaced, radially extending sheds, the insulating member being composed of a main body of an epoxide resin having low polymerization shrinkage, and having bonded thereto the surface layer, said surface layer composed of a polymer of an unsaturated polyester resin, such as resulting from the reaction of a polyhydric alcohol, for instance, ethylene glycol, and an unsaturated polybasic acid or anhydride such as maleic anhydride, and a co-reactive unsaturated monomer having at least one vinyl group, such for example, as mono-styrene, methyl methacrylate and diallyl phthalate.

The invention also includes a method for producing the composite member, such as an integral electrical insulating bushing, including the steps of (1) initially applying a layer of a polyester resin gel to the surfaces of a casting mold, which layer has a thickness ranging from not less than 5 to about 75 mils, (2) casting an epoxy resin into the coated mold, and (3) heating the mold and the resins to a temperature sufficient to cure both the epoxy resin and the polyester resinous layer to obtain an integral casting free from shrinkage cracks having a thick surface layer of highly weather resistant polyester resin.

For a better understanding of the nature and objects of the invention, reference is made to the drawing which is exemplary of one type of terminal bushing assembly comprising an insulating member and a conducting stud member extending through the insulating member.

In the drawing a terminal bushing assembly is generally indicated at 10. It includes a conducting member or stud 12, and the insulating bushing 14. The stud 12 is preferably composed of metal and is provided with attaching means for electrical conductors at the upper end such as threaded end portion 16.

The bushing 14 is composed of a highly electrically insulating material usable under exposed weather conditions, and may be mounted directly on the stud 12. The bushing 14 includes a plurality of longitudinally spaced radially extending portions or sheds 18. In addition, the bushing 14 may include a mounting flange 20 having a plurality of radially spaced apertures 22 for bolts. The flange 20 may be a metal collar having fins or knurled portions whereby it is bonded to the resin body 14. In the alternative, the single bushing having many sheds 14 may be replaced by a plurality of stacked bushings each having one or more sheds joined in a conventional manner. Also, for some lower voltage applications, smooth surfaced bushings comprising a cylindrical tube may be fully adequate, as for instance for stand off insulators.

As shown in the drawing, the outer surface of the bushing including the sheds 18 is covered with a coating or layer 24 which extends continuously from the upper to the lower end of the bushing and forms all of the exposed surfaces. The layer 24 is preferably composed of an insulating material to be described hereinbelow.

The insulating bushing 14 proper is preferably composed of a main body of an epoxy resinous material such as a polyether derivative of a polyhydric organic compound, e.g., the latter being a polyhydric alcohol or a phenol containing at least two phenolic hydroxy groups per molecule, which derivative contains 1,2 epoxy groups. Two types of epoxy resins that have proven quite satisfactory are the epoxy novolac and epoxy resins derived from bis(4-hydroxyphenyl)dimethyl methane, commonly known as "Bisphenol A."

The epoxy novolac resin comprises a phenolaldehyde novolac prepared by reacting one mole of a phenol with less than one mole, for example 0.6 to 0.9 mole of an aldehyde such as formaldehyde, having an average of one glycidyl polyether group attached to each benzene ring in the phenolic product. The general formula is:

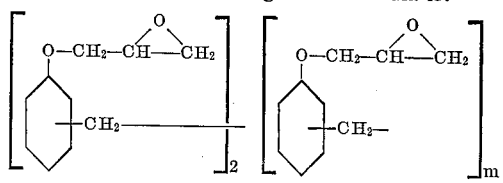

where $m$ has a value of from 1 to 20, with a preferred average of from 1 to 5.

Suitable epoxy resins comprise the reaction product of Bisphenol A with epichlorohydrin in substantially equimolar amounts or a slight excess of the epichlorohydrin in caustic soda results in a 1,2 diepoxy resin having an average molecular weight of at least 150 and an epoxy equivalent weight of from 50 to 2000. Such reaction is well known and is disclosed in U.S. Pats. 2,324,483; 2,494,295, and 2,444,333.

These epoxy resins are modified by adding to them a liquid vinyl type monomer co-reactive therewith, thus monostyrene, methyl methacrylate, and mixtures thereof have given good results. Any acrylic or methacrylic acid ester such as ethyl acrylate or propyl methacrylate may be employed. These vinyl monomers assure that a good bond occurs between the polyester gel surface layer and the epoxy resin body upon full polymerization.

Examples of suitable epoxy resin composites are the following in which all parts are by weight:

EXAMPLE I 10 parts epoxy novolac—having an epoxy equivalent weight of 175 to 182 and a viscosity of 9,000,000 cps. at 25° C.
8 parts monostyrene
7 parts methylated maleic acid adduct of phthalic anhydride
0.5 part maleic anhydride
0.5% by wt. of all above—dimethyl benzyl amine
0.3% by wt. of all above—benzoyl peroxide
0.3% by wt. of all above—tertiary butyl perbenzoate

EXAMPLE II 100 parts epoxy resin, for example Epon No. 828 [1]
80 parts hexahydrophthalic anhydride
0.18 part dimethyl amino methyl phenol

[1] The Epon No. 828 resin has the following formula:

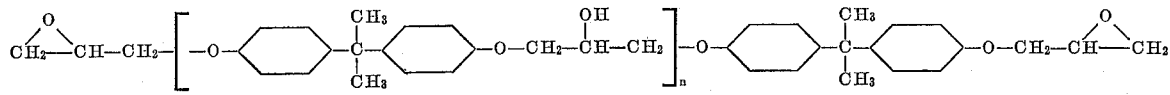

where $n$ has a value of from 0 to 2, and averages about 1.6.

Ordinarily, in the epoxy resin is incorporated a finely divided inorganic solid filler, as for instance, powdered beryl or fused quartz (200 mesh or finer) in order to further reduce the coefficient of expansion and reduce the polymerization shrinkage, and also to reduce the cost. The amount of the inorganic filler may be from 5% to 80% of the weight of the entire epoxy resin casting. A further advantage of a high proportion of filler—50% and greater—is that heavy metal studs and flanges or other hardware may be embedded in the resin without difficulties in cracking.

The layer 24 is preferably composed of a polyester layer having a thickness ranging from at least 5 to about 75 mils with an optimum thickness of about 25 mils. A layer of less than 5 mils thickness is too thin to give sufficiently long time protection to the cast epoxy. The layer 24 is preferably composed of an unsaturated polyester resin comprising a reaction product of a polyhydric alcohol and an unsaturated polybasic acid and a co-reactive unsaturated vinyl type monomer such for example as monostyrene, methyl methacrylate, or diallyl phthalate, or mixtures of two or more. A suitable unsaturated polyester is preferably a linear polyester resin derived from dibasic acids or acid anhydrides and dihydric aliphatic alcohols capable of cross-linking with the vinyl monomer to form thermoset co-polymers. The dibasic acids or anhydrides thereof preferably include at least 20 mol percent of an acid having vinyl type unsaturation, as for example, fumaric acid, maleic anhydride, itaconic acid and citraconic acid. The remainder of the acid may be a saturated aliphatic or cyclic dibasic acid or anhydride thereof, for instance, phthalic anhydride, adipic acid, sebacic acid, and dichlorophthalic acid. Mixture of two or more acids can be employed. Examples of the dihydric alcohol are ethylene glycol, propylene glycol, and dihydroxy dipropyl ether. Small amounts of a trihydroxy alcohol such as glycerol may be present. Liquid vinyl monomers are admixed with the reacted unsaturated polybasic acid-polyhydric alcohol resin in proportion to provide enough vinyl groups to equal from 5% to 1000% of the unsaturated groups in the acid-alcohol reaction product. The vinyl monomer renders the polyesters more fluid as well as being more reactive.

A particularly good polyester formulation comprises from 60 to 75 parts of an unsaturated polyester resin, from about 0 to 36 parts of a methyl methacrylate monomer, and from about 4 to 40 parts of a monostyrene or vinyl toluene or mixtures thereof.

Specific examples are polyesters obtained by reacting (1) diethylene glycol and a mixture of equal parts of maleic and phthalic anhydrides, (2) propylene glycol and a mixture of 2 parts of maleic and one part of isophthalic acid, and (3) ethylene glycol and one part of fumaric acid and one part of adipic acid, there being a stoichiometric equivalent of acid to hydroxy groups. Such polyesters admixed with an unsaturated vinyl type monomer are readily polymerized by vinyl polymerization peroxide catalysts such as benzoyl peroxide, and tertiary butyl perbenzoate.

A polyester resin when combined with thixotropic fillers such as colloidal silica or aluminum silicate, peroxide catalyst, and, usually, a catalyst activator, produces a gel coat for molding or lay-up operations such as the layer or coating 24. A preferred gel coat for this purpose is one in which the vinyl monomer is in part a mixture of styrene and an acrylate or acrylic acid ester, for example, methyl methacrylate or ethyl methacrylate, which yields a highly satisfactory polyester resin weathering layer. In addition, it is desirable to add a portion of finely divided hydrated alumina as a filler since this reduces flammability and greatly improves the resistance of the polyester to arcing and tracking.

An unsaturated polyester resin which has given good results is the reaction product of two mols of hexahydrophthalic anhydride, one mol of maleic anhydride, and three mols of propylene glycol, which polyester resin is dissolved in mixture of from 0 to 9 parts of methyl methacrylate and from 10 to 1 parts of monostyrene or vinyl toluene. An excellent ratio of polyester resin to monomer is 65 to 35 parts by weight. A stabilizer such as 0.001% by weight of tertiary butyl hydroquinone, is added to prevent the polyester and styrene from reacting prematurely. The thixotropic filler, such as 3% of colloidal silica, at least 10% of 6–8 micron particle size hydrated alumina, and 1% of methyl ethyl ketone peroxide and 0.5–1.0% of cobalt naphthenate (6% concentration) is then incorporated.

Generally, the process of producing a weather resistant bushing having a thick surface coating includes the steps of, first, applying a layer of the polyester gel coat to the surface of the mold, as by spraying or slush coating, second, pouring the epoxy resin composition into the coated mold, and third, heating the mold and its context to cure both the polyester gel coat and the epoxy resin to give an integrated casting having a heavy polyester surface layer.

The following examples are illustrative:

EXAMPLE III

Two 4 by 4 inch glass plates were precoated with a polyester gel coat containing an unsaturated polyester, and styrene monomer in the following ratio:

70 parts polyester resin
30 parts styrene monomer

The polyester resin was the reaction product of 1 mol of diethylene glycol, 0.5 mol of maleic anhydride, and 0.5 mol of phthalic anhydride.

A 25 mil thick coating was applied to the surfaces of the glass plates. After 20 to 30 minutes at room temperature the polyester gel coat has partially gelled to a firm resin. The plates were then assembled with a ¼ inch neoprene gasket between them to form a mold. An epoxy resin was poured into the mold and the assembly was then placed in an oven for five hours at a temperature of 135° C. to cure both the epoxy resin and the polyester gel coat. The epoxy resin had the following composition:

10 parts epoxy novolac [1]
8 parts styrene
6 parts hexahydro phthalic anhydride
0.5 part maleic anhydride
0.5% by wt. of above—dimethyl benzyl amine
0.3% by wt. of above—benzoyl peroxide
0.3% by wt. of above—tertiary butyl perbenzoate

[1] The novolac has the following formula:

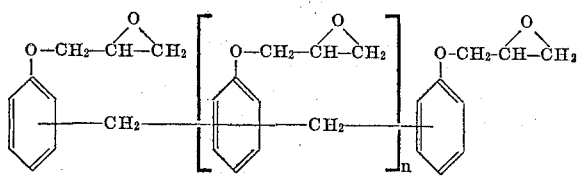

The average value of $n=1.6$.

The resin included 75% by weight of a filler to reduce the shrinkage and coefficient of expansion. The filler was beryl of about 325 mesh particle size.

Four castings made in accordance with the Example III were tested in a differential wet track tester (ASTM tentative standard No. D2302–64T) and compared with similar epoxy resin castings having no polyseter gel coat. Results are shown in the following table:

TABLE.—TRACK ELECTRICAL RESISTANCE

| Watts | Sample with polyester surface layer | Sample without layer |
|---|---|---|
| 1.3 | All 4 passed | 2 failed. |
| 2.1 | do | 1 failed. |
| 5.5 | do | Do. |
| 8.1 | do | |

EXAMPLE IV

The glass plates composing the mold were similarly covered with a polyester gel coat of a thickness of 25 mils and the mold assembled as in Example III. Thereafter, the mold was filled with an epoxy resin and placed in an oven at a temperature of 135° C. to cure both the epoxy resin and the polyester gel coat. The epoxy resin in this example is composed of the following:

| | Parts |
|---|---|
| Epon No. 828 | 100 |
| Hexanhydrophthalic anhydride | 80 |
| Dimethyl amino methyl phenol | 0.18 |

The castings prepared in accordance with the Examples III and IV were placed in a weatherometer for 100 hours together with two castings composed of epoxy resins having no outer coating of polyester gel coat. The latter two coatings developed chalking and exhibited rough surfaces. On the other hand, the castings having the polyester gel coated surfaces were smooth, glossy and appeared completely unaffected throughout the test.

EXAMPLE V

A bushing 10 in the drawing is made in a split mold comprising two half portions that are preliminarily coated by spraying with a 40 mil thick layer of polyester resin having the composition of Example III with 42% of 6 to 8 micron size hydrated alumina added filler. After about 25 minutes the layer thickens to a firm resin gel and the two mold portions are assembled with the stud 12 in place. The epoxy resin is then poured into the mold cavity to fill completely the space between the stud and the polyester layer. The epoxy resin has the composition of Example I and includes 75% by weight of 200 mesh beryl as a filler. The mold and contents are then heated to a temperature of 135° C. for five hours to cure the epoxy resin and the polyester gel coat and to form a bond between them. The completed bushing assembly 10 is then removed from the mold. Bushings formed in this manner are useful as high voltage equipment where weather resistant surfaces are necessary.

Accordingly, the process of the present invention provides a weather resistant insulating member and a bushing in particular having a body portion consisting of an epoxy resin of low shrinkage characteristics and having an exterior coating of a polyester resin bonded to the body of epoxy resin and having extensive weather resisting characteristics.

It will be understood that the above specification and drawing are merely exemplary and not in limitation of the invention.

What is claimed is:

1. A weather resistant electrical insulating member for an electrical conductor comprising at least one bushing having a central bore adapted to receive an electrical conductor, the bushing consisting essentially of a cured epoxy resin reaction product of (a) an epoxy novolac resin having the following structure:

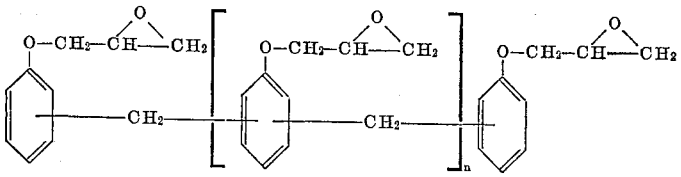

where $n$ has an average value of from 1 to 20, (b) acid anhydride, (c) vinyl monomer, and (d) catalysts, a weather protective layer of polyester resin bonded to the outer surface of the bushing and having a thickness ranging from, not less than 5 to 75 mils, and the polyester resin being a reaction product of an unsaturated polyester resin with a monomeric acrylic acid derivative selected from the group consisting of acrylic and methacrylic acid esters.

2. The member of claim 1 wherein the epoxy resin comprises from 5 to 80% of the entire weight thereof of a finely divided inorganic filler to provide for a low coefficient of thermal expansion and a reduced polymerization shrinkage.

3. A weather resistant electrical insulating member for an electrical conductor comprising at least one bushing having a central bore adapted to receive an electrical conductor, the bushing being composed of an epoxy resin derived by reacting an acid anhydride with an epoxy compound having the following structure:

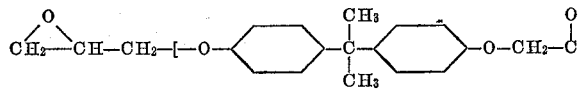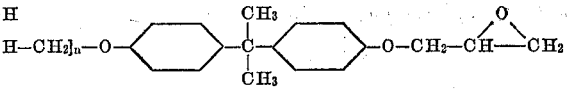

where $n$ has a value of from 0 to 2, and a weather protective layer of polyester resin bonded to the outer surface of the bushing and having a thickness ranging from not less than 5 to about 75 mils, and the polyester resin being the reaction product of an unsaturated polyester resin with a monomeric acrylic acid derivative selected from the group consisting of acrylic and methacrylic acid esters.

4. The weather resistant electrical insulating member of claim 1 wherein the epoxy resin is derived by reacting at least 5 mol percent of at least one vinyl monomer therewith; the vinyl monomer being selected from at least one of the group consisting of monostyrene, methyl methacrylate, and diallyl phthalate.

5. The member of claim 4 wherein the epoxy resin comprises from 5 to 80% of the entire weight thereof of a finely divided inorganic filler to provide for a low coefficient of thermal expansion and a reduced polymerization shrinkage.

References Cited

UNITED STATES PATENTS

| | | | |
|---|---|---|---|
| 2,961,518 | 11/1960 | Hermann | 200—166 |
| 3,110,758 | 11/1963 | Meier | 174—211 |
| 3,138,618 | 6/1964 | Nikles et al. | 260—348 |
| 3,147,279 | 9/1964 | Porret et al. | 260—340.7 |

FOREIGN PATENTS

| | | |
|---|---|---|
| 1,113,726 | 9/1961 | Germany. |

BENJAMIN R. PADGETT, Primary Examiner

U.S. Cl. X.R.

174—209